United States Patent
Hasegawa et al.

(10) Patent No.: US 7,936,156 B2
(45) Date of Patent: May 3, 2011

(54) DC-DC CONVERTER AND CONTROL METHOD THEREOF

(75) Inventors: Morihito Hasegawa, Aichi (JP); Takashi Matsumoto, Aichi (JP); Ryuta Nagai, Aichi (JP); Shoji Tajiri, Aichi (JP)

(73) Assignee: Fujitsu Semiconductor Limited, Yokohama (JP)

( * ) Notice: Subject to any disclaimer, the term of this patent is extended or adjusted under 35 U.S.C. 154(b) by 339 days.

(21) Appl. No.: 12/136,579

(22) Filed: Jun. 10, 2008

(65) Prior Publication Data

US 2008/0303500 A1 Dec. 11, 2008

(30) Foreign Application Priority Data

Jun. 11, 2007 (JP) .................................. 2007-154469

(51) Int. Cl.
*G05F 1/40* (2006.01)
(52) U.S. Cl. ........................................................ 323/282
(58) Field of Classification Search .................. 323/271, 323/282, 351
See application file for complete search history.

(56) References Cited

U.S. PATENT DOCUMENTS

| | | | | |
|---|---|---|---|---|
| 5,705,919 A | * | 1/1998 | Wilcox | 323/282 |
| 6,057,675 A | * | 5/2000 | Tateishi | 323/283 |
| 6,396,251 B2 | * | 5/2002 | Corva et al. | 323/283 |
| 7,019,501 B2 | | 3/2006 | Dogome et al. | |
| 2005/0030777 A1 | | 2/2005 | Dogome et al. | |
| 2007/0236204 A1 | * | 10/2007 | Tateno et al. | 323/316 |

* cited by examiner

*Primary Examiner* — Adolf Berhane
*Assistant Examiner* — Emily Pham
(74) *Attorney, Agent, or Firm* — Arent Fox LLP

(57) ABSTRACT

A first power supply line and having a first conductivity type a second transistor coupled between the first transistor and a second power supply line, and having the first conductivity type an output unit driving a first control signal causing the first transistor to become conductive, based on a drive voltage, and outputting the first control signal to the first transistor and a boot strap circuit including a capacitor having a first end coupled to a node of the first transistor and the second transistor and supplying the output unit with the drive voltage based on the capacitor, wherein an electric potential of the first end is reduced before the first transistor becomes conductive.

14 Claims, 11 Drawing Sheets

DC-DC CONVERTER AND CONTROL METHOD THEREOF

CROSS-REFERENCE TO RELATED APPLICATIONS

This application claims the benefit of priority of Japanese Patent Application No. 2007-154469 filed on Jun. 11, 2007, the entire contents of which are incorporated herein by reference.

BACKGROUND

1. Field

The present application relates to a DC-DC converter and a control method of the DC-DC converter.

2. Description of the Related Art

FIG. 1 illustrates a conventional DC-DC converter 100. The DC-DC converter 100 is a synchronous rectification type DC-DC converter. A high-side transistor FET101 coupled to an input voltage VIN is an N-type field effect transistor (FET). A high level at an output of a driver DRV103 for supplying the high-side transistor FET101 with a gate voltage becomes a value equal to an input voltage Vin plus (+) a power supply voltage VB, based on a boot strap circuit including a capacitor C105 and a diode D106.

As shown in FIG. 1, a first end of the capacitor C105 is coupled to a node LX between a source of the high-side transistor FET101 and a drain of a Low-side transistor FET102, which is coupled to a ground voltage (zero (0) volts). A second end of the capacitor C105 is coupled to a cathode of the diode D106. An anode of the diode D106 is coupled to the power supply voltage VB.

When the conventional DC-DC converter 100 in FIG. 1 operates in a continuous conduction mode (CCM), conduction of the high-side transistor FET101 causes a voltage VLX of the node LX to become a value equal to the input voltage Vin. Then when the low-side transistor FET102 becomes conductive, the voltage VLX of the node LX drops to zero (0) volts from the input voltage VIN. When the voltage VLX of the node LX drops to 0 volts from the input voltage VIN, a potential difference across the capacitor C105 becomes a value equal to the power supply voltage VB.

Next, when the high-side transistor FET101 becomes conductive, the voltage VLX of the node LX rises to the value equal to the input voltage Vin from zero (0) volts. When the voltage VLX rises to the value equal to the input voltage Vin from zero (0) volts, a drive voltage VDVDD of the driver DRV103 becomes equal to the power supply voltage VB plus (+) the input voltage Vin, in response to a capacitive coupling of the capacitor C105.

When the drive voltage VDVDD becomes equal to the power supply voltage VB plus (+) the input voltage Vin, the voltage equal to the power supply voltage VB plus (+) the input voltage Vin is applied to a gate of the high-side transistor FET101. This causes the high-side transistor FET101 to become conductive in low impedance.

FIG. 2 illustrates a timing chart indicating operations of the conventional DC-DC converter 100 in FIG. 1 in a discontinuous conduction mode (DCM).

As shown in FIG. 2, when electromagnetic energy stored in an inductor L of FIG. 1 disappears in the DCM, the voltage VLX of the node LX of FIG. 1 becomes equal to an output voltage Vo in a period 200 in which the high-side transistor FET101 of FIG. 1 and the low-side transistor FET102 of FIG. 1 are non-conductive. When the voltage VLX of the node LX of FIG. 1 becomes equal to the output voltage Vo, the potential difference across the capacitor C105 of FIG. 1 becomes a value equal to the power supply voltage VB minus (−) the output voltage Vo.

When the voltage VLX of the node LX of FIG. 1 becomes equal to the input voltage Vin, the drive voltage VDVDD becomes equal to the power supply voltage VB minus (−) the output voltage Vo plus (+) the input voltage Vin, in response to the capacitive coupling of the capacitor C105 of FIG. 1. When comparing the DCM with the CCM, a voltage lower by the output voltage Vo than that in the case of CCM is supplied to the gate of the high-side transistor FET101 of FIG. 1.

As discussed above, in the conventional DC-DC converter, the voltage that is lower by the output voltage Vo than that in the case of CCM is supplied to the high-side transistor FET101, so that a conductive impedance of the high-side transistor FET101 becomes higher. That is, there arises a problem in that the high-side transistor FET101 becomes non-conductive at the time at which the high-side transistor becomes conductive.

SUMMARY

Aspects of embodiment of the present invention include a DC-DC converter including a first transistor coupled to a first power supply line and having a first conductivity type a second transistor coupled between the first transistor and a second power supply line, and having the first conductivity type an output unit driving a first control signal causing the first transistor to become conductive, based on a drive voltage, and outputting the first control signal to the first transistor and a boot strap circuit including a capacitor having a first end coupled to a node of the first transistor and the second transistor and supplying the output unit with the drive voltage based on the capacitor, wherein an electric potential of the first end is reduced before the first transistor becomes conductive.

DETAILED DESCRIPTION OF THE EMBODIMENTS

Figure 1:
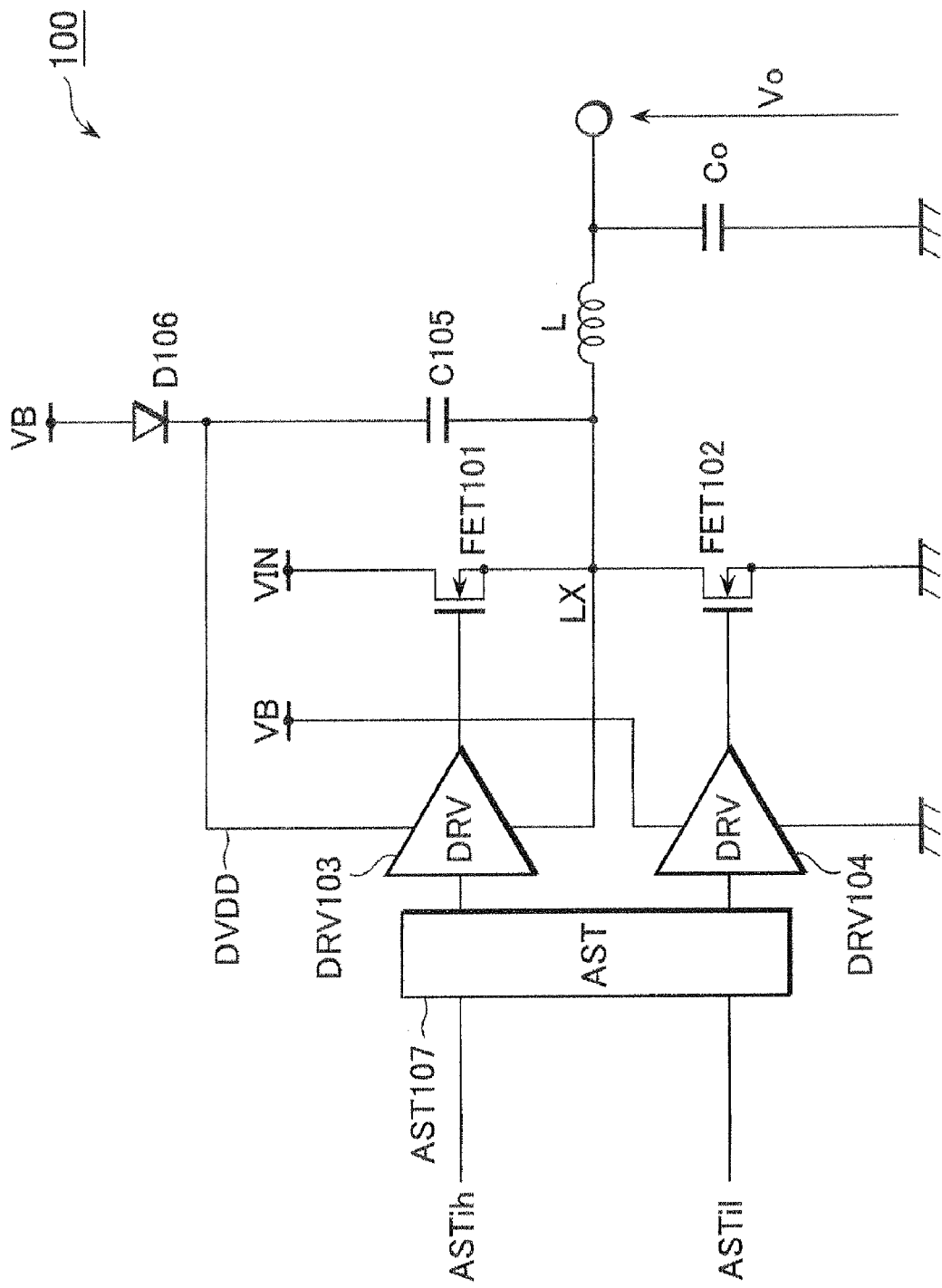
FIG. 1 illustrates a circuit diagram of a conventional DC-DC converter.
Figure 2:
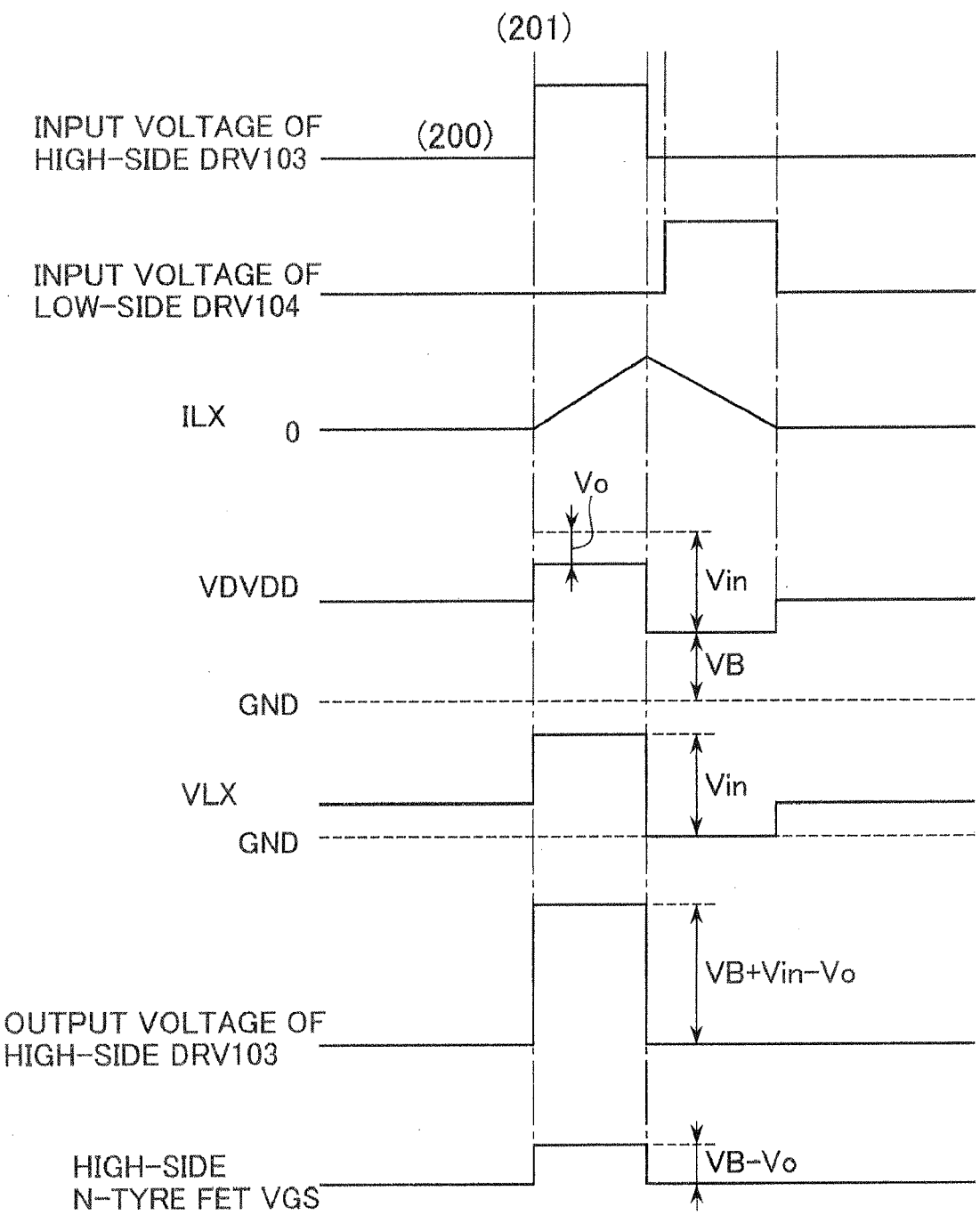
FIG. 2 illustrates a timing chart indicating operations of the conventional DC-DC converter in FIG. 1.
Figure 3:
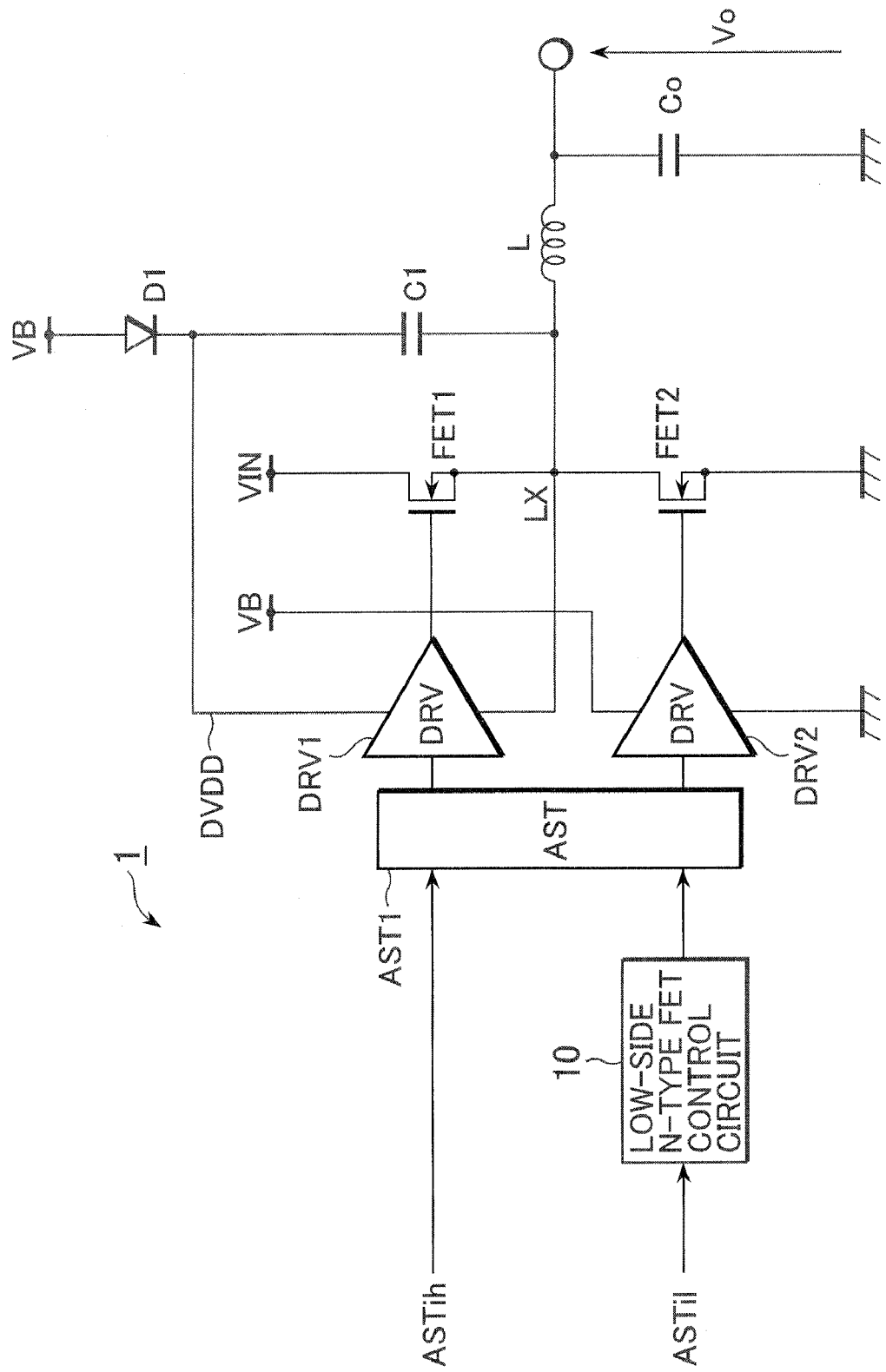
FIG. 3 illustrates a circuit diagram of a DC-DC converter according to a first exemplary embodiment in accordance with aspects of the present invention.

FIG. 3 illustrates a DC-DC converter 1 according to a first embodiment.

As shown in FIG. 3, the DC-DC converter 1 includes a high-side transistor FET1 coupled to an input voltage VIN, a low-side transistor FET2 coupled to a ground voltage, an anti-shoot-through AST1 which controls the high-side transistor FET1 and the low-side transistor FET2 so as not to become simultaneously conductive, a driver DRV1 for driving the high-side transistor FET1, a driver DRV2 for driving the low-side transistor FET2, a diode 1, a capacitor C1, a capacitor Co, an inductor L, and a low-side n-type FET control circuit 10 for controlling conduction timing of the low-side transistor FET2. The DC-DC converter 1 may be, for example, a DC-DC converter that operates in current mode or in voltage mode.

As further shown in FIG. 3, a high-side transistor control signal ASTih that commands switching control of the high-side transistor FET1 and an output signal of the low-side n-type FET control circuit 10 are input to the anti-shoot-through AST1. The anti-shoot through AST1 may function to delay transition timing of an input signal supplied to a gate of the low-side transistor FET2 from a low level to a high level after a transition of an input signal supplied to a gate of the high-side transistor FET1 from a high level to a low level so that the high-side transistor FET1 and the low-side transistor FET2 do not become simultaneously conductive.

As further shown in FIG. 3, the driver DRV1 is coupled to an output on a high-side transistor FET1 side of the anti-shoot through AST1. A high level at an output of the driver DRV1 becomes substantially equal to a drive voltage VDVDD. A low level at the output of the driver DRV1 becomes substantially equal to a voltage VLX of a node LX between the high-side transistor FET1 and the low-side transistor FET2.

The driver DRV2 is coupled to an output on a low-side transistor FET2 side of the anti-shoot through AST1. A high level at an output of the driver DRV2 becomes substantially equal to a power supply voltage VB. A low level at the output of the driver DRV2 substantially equals to a ground voltage.

The output of the driver DRV1 is coupled to the gate of the high-side transistor FET1. An input voltage Vin is coupled to a drain of the high-side transistor FET1. The output of the driver DRV2 is coupled to the gate of the low-side transistor FET2. The ground voltage is coupled to a source of the low-side transistor FET2. A source of the high-side transistor FET1 and a drain of the low-side transistor FET2 are coupled at the node LX.

The node LX is further coupled to a first end of the inductor L and a first end of the capacitor C1.

A second end of the capacitor C1 is a drive voltage node DVDD. A cathode of the diode D1 is further coupled to the second end of the capacitor C1. The power supply voltage VB is coupled to an anode of the diode D1. The drive voltage VDVDD of the drive voltage node DVDD becomes a voltage value equal to or greater than the voltage value of the power supply voltage VB.

A second end of the inductor L is coupled to a rectification capacitor Co. The rectification capacitor Co generates an output voltage Vo.

Figure 4:
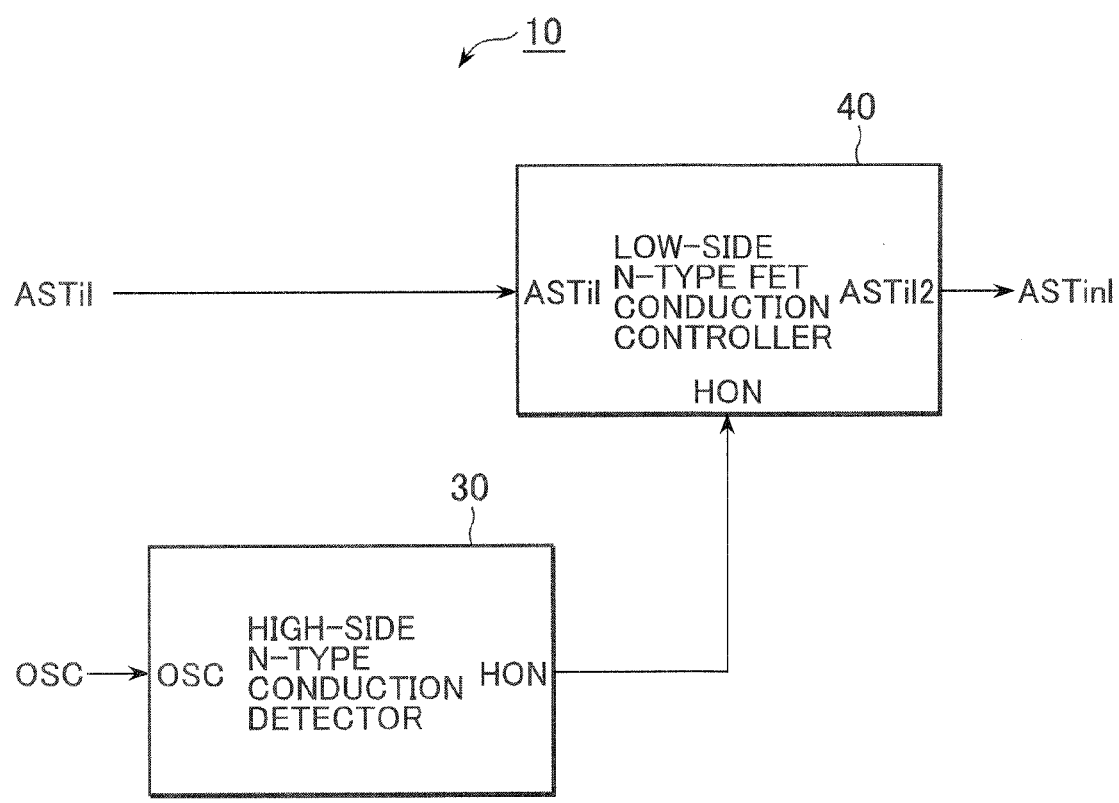
FIG. 4 illustrates a block diagram of a low-side n-type field effect transistor (FET) control circuit in FIG. 3.

FIG. 4 illustrates a block diagram indicating the low-side n-type FET control circuit 10 in FIG. 3. The low-side n-type FET control circuit 10 includes a high-side n-type FET conduction detector 30 and a low-side n-type FET conduction controller 40.

As shown in FIG. 4, the high-side n-type FET conduction detector 30 detects conduction of the high-side transistor FET1. For example, in a DC-DC converter during a current mode, since the high-side transistor control signal ASTih is generated when an RS flip-flop (not shown) is set in response to a rising edge of an oscillator, it may be allowed to detect the conduction of the high-side transistor FET1 by using a falling edge signal of the oscillator.

Figure 5:
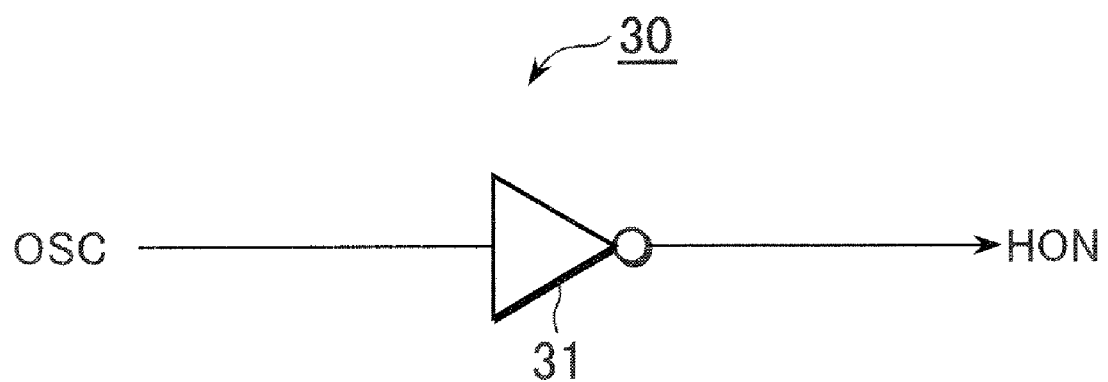
FIG. 5 illustrates a circuit diagram of a high-side n-type FET conduction detector in FIG. 4.

FIG. 5 illustrates a circuit diagram of the high-side n-type FET conduction detector 30 in FIG. 4. In the high-side n-type FET conduction detector 30, an oscillator signal OSC is input to an input terminal of an inverter 31. A high-side ON signal HON is output from an output terminal of the inverter 31.

Figure 6:
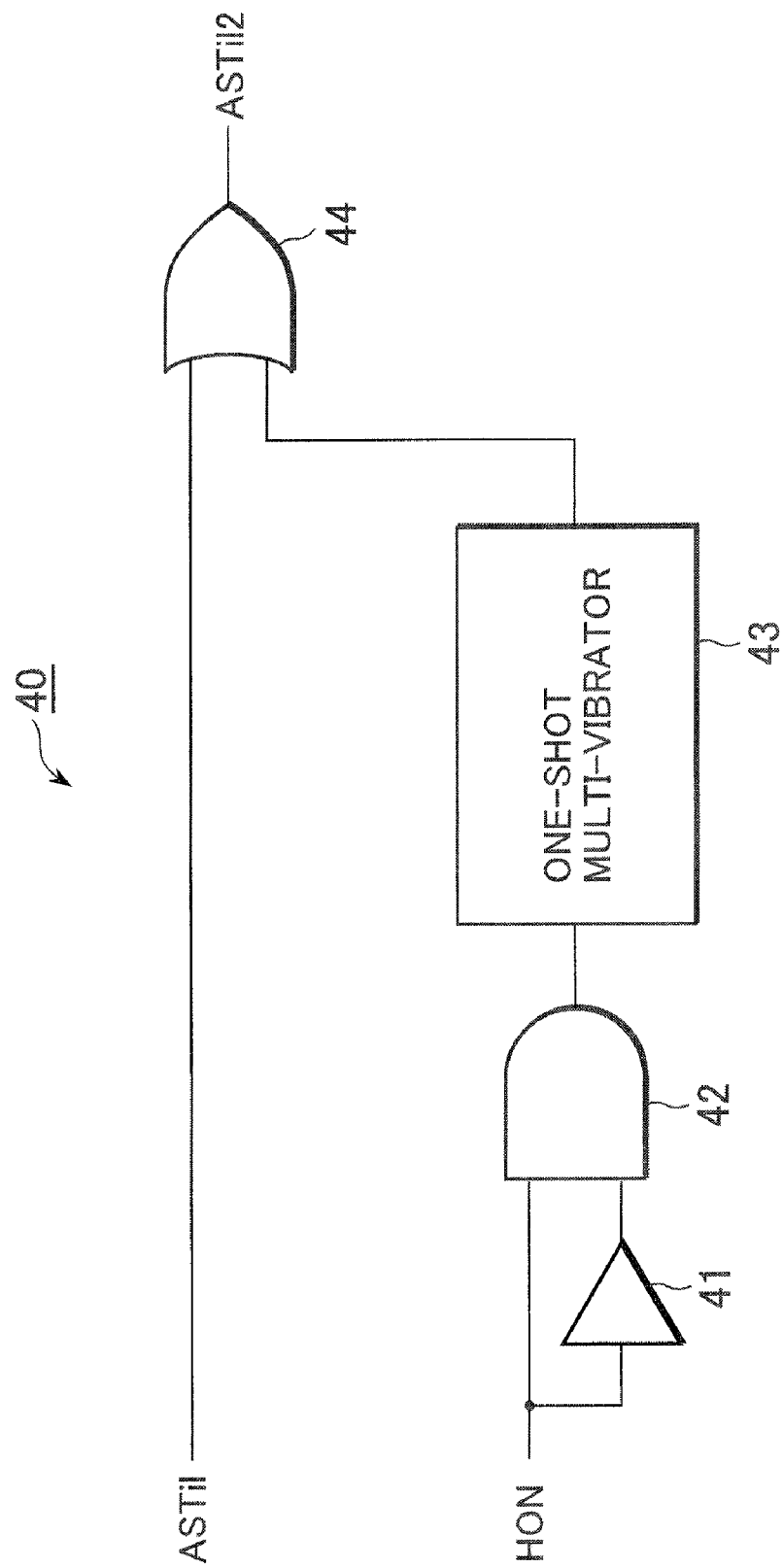
FIG. 6 illustrates a circuit diagram of a low-side n-type FET conduction controller in FIG. 4.

FIG. 6 illustrates a circuit diagram of the low-side n-type FET conduction controller 40 in FIG. 4. The low-side n-type FET conduction controller 40 controls conduction of the low-side transistor FET2.

As shown in FIG. 6, the low-side n-type FET conduction controller 40 includes a delay element 41, an AND gate 42, a one-shot multi-vibrator 43, and an OR gate 44.

As further shown FIG. 6, the high-side ON signal HON is input to a first input terminal of the AND gate 42. The high-side ON signal HON is input to a second input terminal of the AND gate 42 via the delay element 41. When the high-side ON signal HON shifts from a low level to a high level, a high level signal is output to an output terminal of the AND gate 42, after elapsing a delay period determined based on the delay element 41. In other words, the high level signal generated by the delay element 41 and the AND gate 42 is input to the one-shot multi-vibrator 43.

The one-shot multi-vibrator 43 in FIG. 6 generates a pulse having a predetermined pulse width when the input signal becomes the high level.

As further shown in FIG. 6, a low-side AST input signal ASTil is input to a first input terminal of the OR gate 44. An output terminal of the one-shot multi-vibrator 43 is coupled to a second input terminal of the OR gate 44. At the OR gate 44, the low-side AST input signal ASTil is sent to the output terminal and the pulse generated by the delay element 41, the AND gate 42, and the one-shot multi-vibrator 43 is sent, as a low-side AST input signal ASTil2, to the output terminal, based on the high-side ON signal HON.

Figure 7:
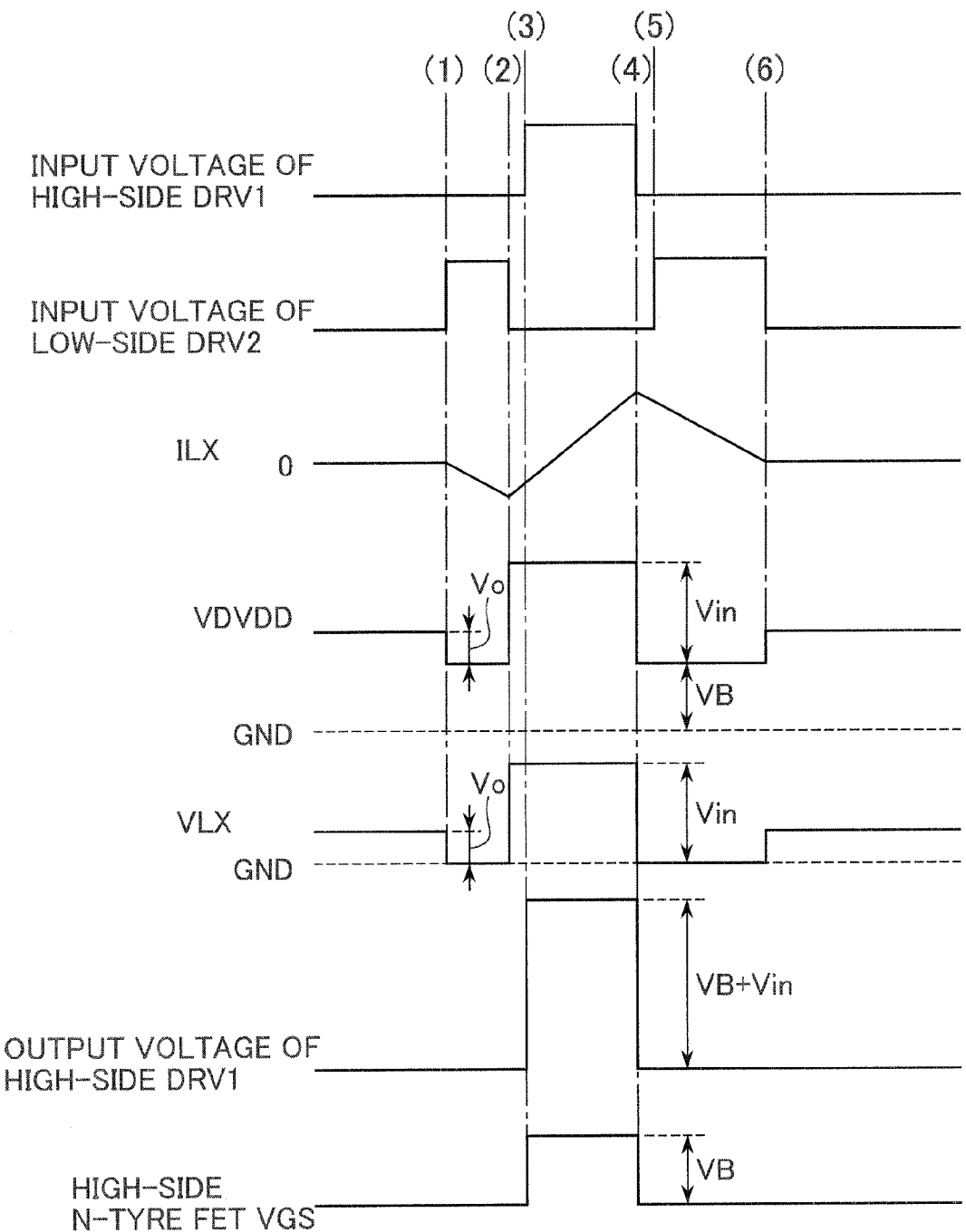
FIG. 7 illustrates a timing chart indicating operations of the DC-DC converter according to the first exemplary embodiment in accordance with aspects of the present invention.

FIG. 7 illustrates a timing chart indicating operations of the DC-DC converter in FIG. 3.

As shown in FIG. 7, in a period prior to (1), since an inductance current ILX flowing through the inductor L in FIG. 3 is substantially zero (0), the voltage VLX of the node LX is substantially equal to the output voltage Vo. At the point of time of (1), an input voltage of a low-side DRV2 in FIG. 3 rises from a low level to a high level in response to an output of the one-shot multi-vibrator 43 in FIG. 6. Since the low-side transistor FET2 becomes conductive when the input voltage of the low-side DRV2 rises from a low level to a high level, the voltage VLX of the node LX in FIG. 3 falls to substantially zero (0) volts from the output voltage Vo. Since the inductor current ILX having a negative gradient is caused to flow to the inductor L in FIG. 3 when the voltage VLX of the node LX in FIG. 3 falls to substantially zero (0) volt from the output voltage Vo, electromagnetic energy in the negative direction is stored in the inductor L in FIG. 3.

As further shown in FIG. 7, at the time of (2), the output of the one-shot multi-vibrator 43 in FIG. 6 falls to a low level and the low-side transistor FET2 in FIG. 3 becomes non-conductive. When the low-side transistor FET2 in FIG. 3 becomes non-conductive, the electromagnetic energy in the negative direction stored in the inductor L in FIG. 3 is released, so that the current is caused to flow from the inductor L to the node LX in FIG. 3. In addition, the current is caused to flow to the input voltage Vin via a body diode (not shown) in the high-side transistor FET1 in FIG. 3. Based on the current flowing from the inductor L to the node LX in FIG. 3, the voltage VLX of the node LX in FIG. 3 becomes equal to the input voltage Vin. When the voltage VLX of the node LX in FIG. 3 becomes substantially equal to the input voltage Vin, the drive voltage VDVDD becomes substantially equal to a voltage value of power supply voltage VB plus (+) the input voltage Vin, with a capacitive coupling of the capacitor C1 in FIG. 3.

As further shown in FIG. 7, at the point of time of (3), an input voltage of a high-side DRV1 in FIG. 3 rises from a low level to a high level. Since the drive voltage VDVDD becomes substantially equal to the voltage value of the power supply voltage VB plus (+) the input voltage Vin at the point of time (2) as disclosed above, the high level at the output of the driver DRV1 in FIG. 3 becomes substantially equal to the drive voltage VDVDD, that is, high level at the output of the driver DRV1 in FIG. 3 becomes substantially equal to the power supply voltage VB plus (+) the input voltage Vin In consequence, the high-side transistor FET1 becomes conductive. Once the high-side transistor FET1 in FIG. 3 becomes conductive, the voltage VLX of the node LX in FIG. 3 becomes substantially equal to the input voltage Vin. This causes a voltage that is substantially equal to the power supply voltage VB plus (+) the input voltage Vin to be maintained at the drive voltage VDVDD. Since the voltage VLX of the node LX in FIG. 3 is substantially equal to the input voltage Vin and the drive voltage VDVDD is substantially equal to the power supply voltage VB plus (+) the input voltage Vin, a VGS of the high-side transistor FET1 is substantially equal to the power supply voltage VB. In addition, at the point of time (3), since the inductor current ILX having a positive gradient is caused to flow in the inductor L in FIG. 3, the electromagnetic energy in the positive direction is stored in the inductor L in FIG. 3.

As further shown in FIG. 7, at the point of time (4), when the input voltage of the high-side DRV1 in FIG. 3 falls from the high level to the low level, the high-side transistor FET1 in FIG. 3 becomes non-conductive. The electromagnetic energy in the positive direction that is stored in the inductor L in FIG. 3 is released via the body diode (not shown) of the low-side transistor FET2 in FIG. 3. When the electromagnetic force in the positive direction stored in the inductor L in FIG. 3 is released, the inductor current ILX changes its gradient to the negative gradient. Since the node voltage VLX of the node LX in FIG. 3 falls to substantially zero (0) volts in response to the negative gradient of the inductor current ILX, the drive current VDVDD shifts to the voltage value of the power supply voltage VB.

As further shown in FIG. 7, at the point of time (5), when the input voltage of the low-side DRV2 in FIG. 3 rises from the low level to the high level, the low-side transistor FET2 in FIG. 3 becomes conductive. In the inductor L in FIG. 3, the inductor current ILX changes along the negative gradient.

As further shown in FIG. 3, at the point of time (6), the input voltage of the low-side DRV2 in FIG. 3 falls from the high level to the low level, the low-side transistor FET2 in FIG. 3 becomes non-conductive. At the point of time (6), the electromagnetic energy stored in the inductor L in FIG. 3 disappears, that is, becomes substantially zero (0), the voltage VLX of the node LX FIG. 3 becomes substantially equal to the output voltage Vo.

As disclosed according to FIG. 7, since the DC-DC converter, according to the first embodiment in FIG. 3, causes the low-side transistor FET2 in FIG. 3 to become conductive before the high-side transistor FET1 becomes conductive, the drive voltage (VDVDD) for driving the high-side transistor FET1 in FIG. 3 is applied to the gate of the high-side transistor FET1. The DC-DC converter, according to the first embodiment in FIG. 3 causes a conductive impedance of the high-side transistor FET1 in FIG. 3 to become high, that is, the non-conduction of the high-side transistor FET1 in the timing at which the high-side transistor FET1 becomes conductive may be prevented.

When the DC-DC converter according to the first embodiment in FIG. 3 operates in the current mode, the high-side n-type FET conduction detector 30 in FIG. 5 including only one inverter may be used. In the DC-DC converter in the voltage mode, a high-side n-type FET conduction control signal shifts from a high level to a low level in order to drive the high-side transistor FET1 in FIG. 3 at a first timing at which an output signal from an error amplifier and an output signal from a triangular wave oscillator intersect with each other. In addition, the high-side n-type FET conduction control signal shifts from the low level to the high level at another timing that is different from the first timing (see FIG. 9). When the DC-DC converter, according to the first embodiment in FIG. 3, operates in the voltage mode, it may detect the conduction of the high-side transistor FET1 in FIG. 3 by applying an offset to at least one of the output signal from the error amplifier and the output signal from the triangular wave oscillator so that the output signal from the error amplifier and the output signal from the triangular wave oscillator intersect with each other at a second timing which is earlier than the first timing.

Figure 8:
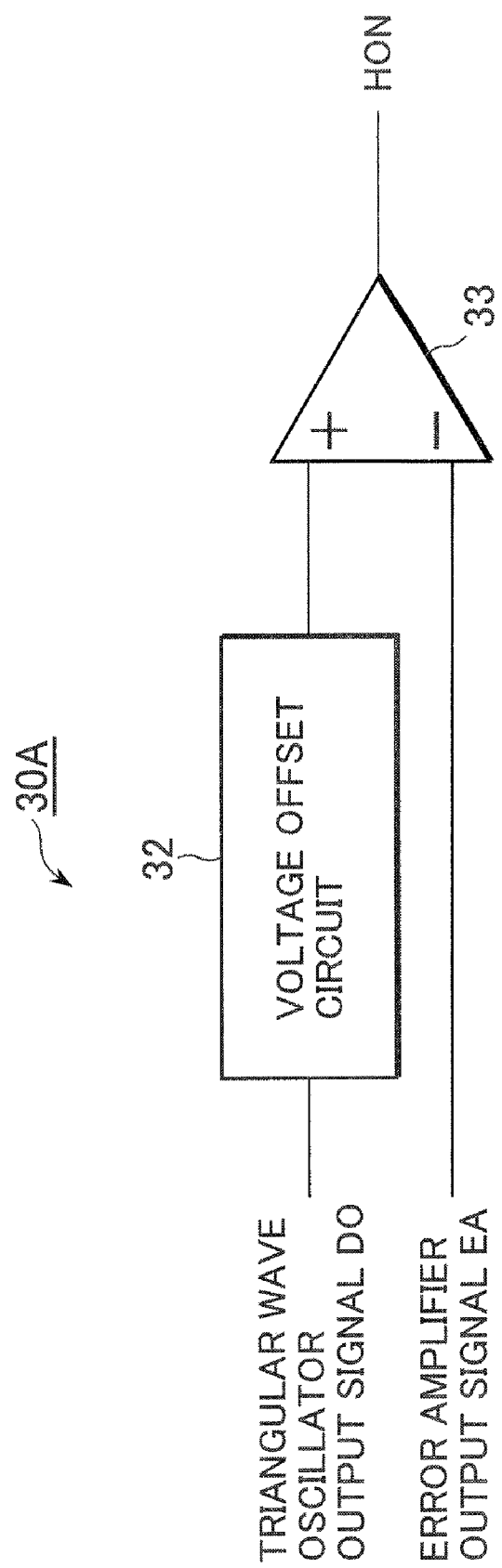
FIG. 8 illustrates another example of the high-side n-type FET conduction detector in FIG. 4.

FIG. 8 illustrates a circuit diagram of a high-side n-type conduction detector 30 A. The high-side n-type conduction detector 30 A includes a voltage offset circuit 32 and a comparator 33. When the DC-DC converter according to the first embodiment in FIG. 3 operates in the voltage mode, the high-side n-type conduction detector 30 in FIG. 4 may be replaced by the high-side n-type conduction detector 30 A.

As shown in FIG. 8, a triangular wave oscillator output signal DO having a waveform of a triangular wave is input to the voltage offset circuit 32. A positive voltage value is applied to the triangular wave oscillator output signal DO in the voltage offset circuit 32. The triangular wave oscillator output signal DO, to which the positive voltage value is applied, is input to a non-inverting input in the comparator 33. An error amplifier output signal EA, based on a difference between the output voltage Vo and a reference voltage, is input to an inverting input of the comparator 33.

Figure 9:
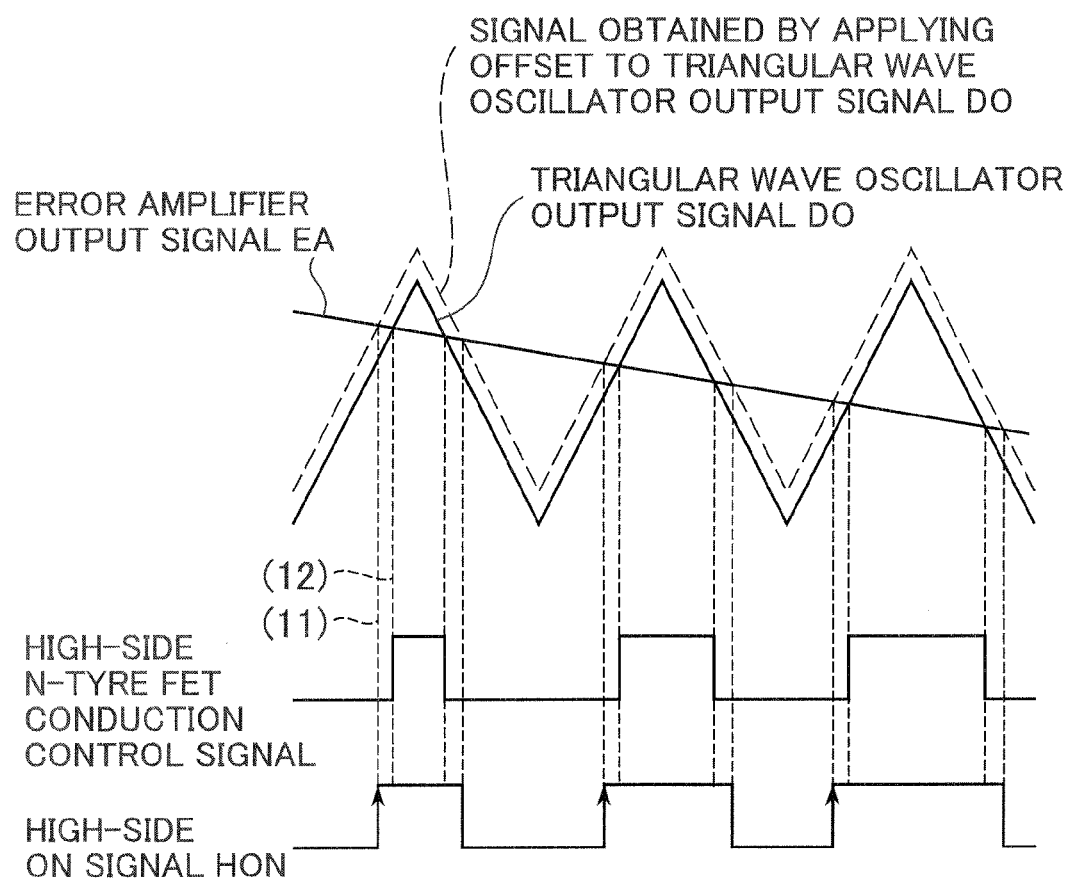
FIG. 9 illustrates a timing chart indicating operations of the high-side n-type FET conduction detector in FIG. 8.

FIG. 9 illustrates a timing chart indicating operations of the high-side n-type FET conduction detector 30 A in FIG. 8. In FIG. 9, a waveform of the triangular wave, shown by a solid line, denotes the triangular wave oscillator signal DO. A waveform of the triangular wave shown by a dotted line denotes a signal obtained by applying the positive voltage value to the triangular wave oscillator signal DO in FIG. 8. In other words, the waveform of the triangular wave shown by the dotted line denotes an output signal of the voltage offset circuit 32 in FIG. 8. A straight line, shown by a solid line having a negative gradient, denotes the error amplifier output signal EA in FIG. 8.

As shown in FIG. 9, when the triangular wave oscillator output signal Do has a higher voltage than a voltage of the error amplifier output signal EA, the high-side n-type FET conduction control signal rises to the high level (12). When the triangular wave oscillator output signal DO has a lower voltage than the voltage of the error amplifier output signal EA, the high-side n-type FET conduction control signal falls to the low level.

As further shown in FIG. 9, in the high-side n-type FET conduction detector 30A in FIG. 8, when the signal obtained by applying the positive voltage value to the triangular wave oscillator output signal DO has a higher voltage than the voltage of the error amplifier output signal EA, the high-side n-type FET conduction control signal rises to the high level (11). When the signal obtained by applying the positive voltage value to the triangular wave oscillator output signal DO has a lower voltage than the voltage of the error amplifier output signal EA, the high-side n-type FET conduction control signal falls to the low level.

As disclosed with reference to FIG. 9, the high-side n-type FET conduction detector 30A in FIG. 8 outputs the high-side ON signal HON at the second timing (12) which is earlier than the first timing (11). In the DC-DC converter in FIG. 3 to which the high-side n-type FET conduction FET detector 30 A is applied, even if the oscillator signal OSC is not obtained in operation of the voltage mode, the high-side ON signal HON is output.

When the high-side n-type FET conduction control signal rises to the high level, and when the error amplifier output signal EA has the higher voltage than that of the triangular wave oscillator output signal DO, the error amplifier signal EA may be electrically input to a non-inverting terminal and the triangular wave oscillator output signal DO is electrically input to an inverting terminal in the comparator 33 in FIG. 8. FIG. 9 illustrates one example in which the positive voltage value is applied only to the triangular wave oscillator output signal DO. That is to say, in the example in FIG. 9, a positive offset is applied only to the triangular wave oscillator output signal DO. As another example of applying the offset, a negative offset may be applied only to the error amplifier output signal EA. A positive offset may also be applied to the triangular wave oscillator output signal DO and the negative offset may be applied to the error amplifier output signal EA.

Figure 10:
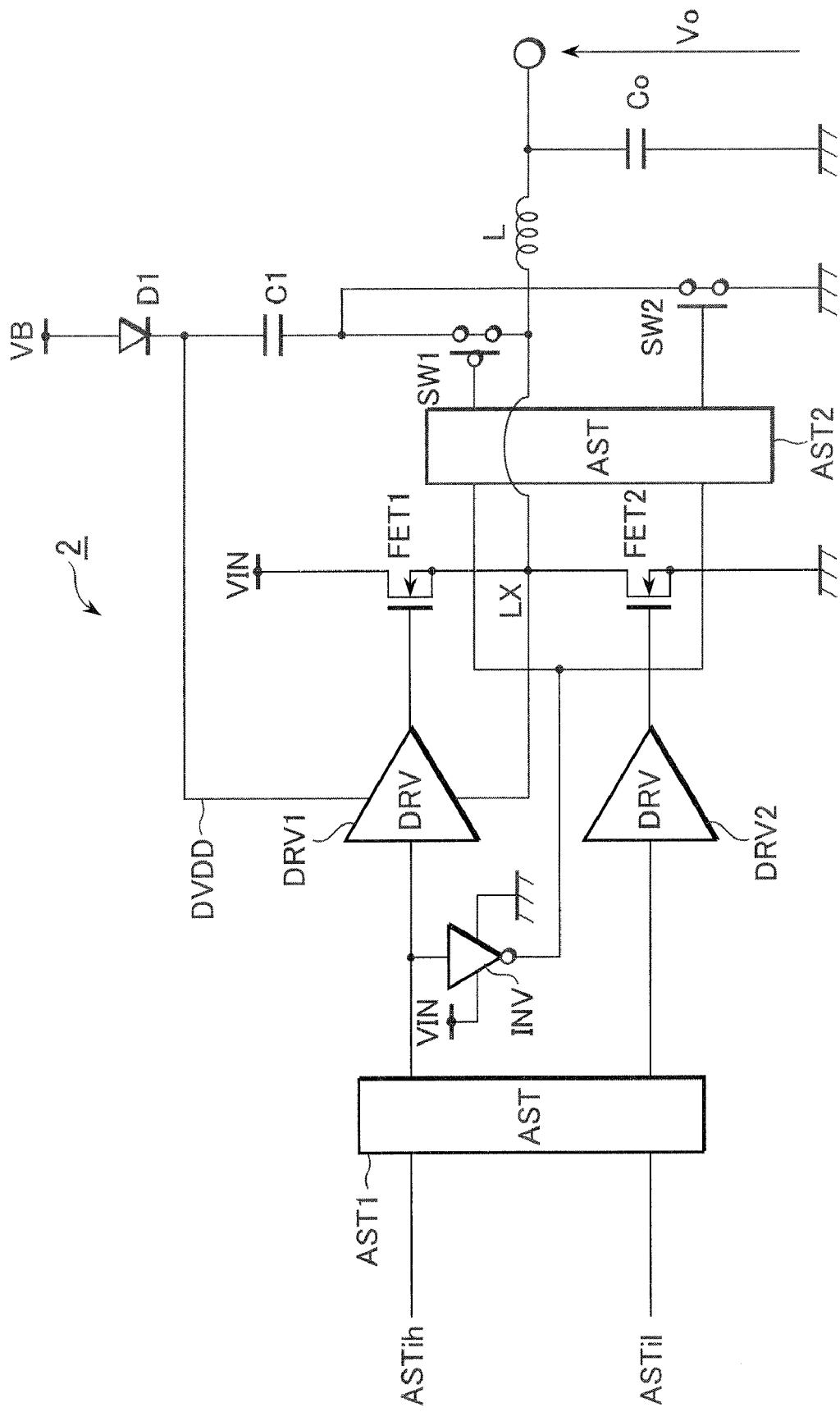
FIG. 10 illustrates a circuit diagram of a DC-DC converter according to a second exemplary embodiment in accordance with aspects of the present invention.

FIG. 10 illustrates a DC-DC converter 2 according to a second exemplary embodiment in accordance with aspects of the present invention. As shown in FIG. 10, the DC-DC converter 2 has a configuration in which a low-side n-type FET control circuit 10 is removed from the DC-DC converter 1 of the first embodiment in FIG. 3 and an inverter INV, anti-shoot-through AST2, a switch SW1, and a switch SW2 are added. Hereinafter, the same reference numerals as those in the first embodiment denote the same or corresponding parts as those in the first embodiment, and the descriptions thereof will be reduced or omitted.

As shown in FIG. 10, an input of the inverter INV is coupled to a high-side output terminal of an anti-shoot-through AST1. An output of the inverter INV is coupled to a high-side and a low side of the anti-shoot-through AST2.

A high-side output terminal of the anti-shoot-through AST2 is coupled to a control terminal of the switch SW1. A low-side output terminal of the anti-shoot-through AST2 is coupled to a control terminal of the switch SW2.

The switch SW1 becomes conductive when a low level is input to the control terminal of the switch SW1. On the other hand, the switch SW1 becomes non-conductive when a high level is input to the control terminal of the switch SW1. A first end of the switch SW1 is coupled to a terminal on an opposite side of a power supply voltage VB of the capacitor C1. A second terminal of the switch SW1 is coupled to a node LX.

The switch SW2 is a switch having an inverted-characteristic to that of the switch SW1, that is, conduction timing and non-conduction timing of the switch SW2 is inverted to that of the switch SW1. The switch SW2 becomes conductive when a high level is input to the control terminal of the switch SW2. On the other hand, the switch SW2 becomes non-conductive when a low level is input to the control terminal of the switch SW2. A first end of the switch SW2 is coupled to the terminal on the opposite side of the power supply voltage VB of the capacitor C1. A second terminal of the switch SW2 is coupled to a ground voltage.

In the DC-DC converter 2 in FIG. 10, when a high-side transistor FET1 becomes non-conductive based on a low level of a high-side transistor control signal ASTih, the switch SW1 becomes non-conductive and the switch SW2 becomes conductive. When, the switch SW1 becomes non-conductive and the switch SW2 becomes conductive, a potential difference across the capacitor C1 becomes substantially equal to the power supply voltage VB.

Then when the high-side transistor FET1 becomes conductive with the high-side transistor control signal ASTih being shifted from the low level to a high level, the switch SW1 becomes conductive and the switch SW2 becomes non-conductive.

When the switch SW1 becomes conductive and the switch SW2 becomes non-conductive, the node LX is coupled to the terminal of the capacitor C1 on the opposite side to the power supply voltage VB of the capacitor C1. Since a voltage VLX of the node LX coupled to the terminal of the capacitor C1 on the opposite side of the power supply voltage VB of the capacitor C1 becomes substantially equal to an input voltage Vin, a drive voltage VDVDD becomes substantially equal to a value of the power supply voltage VB plus (+) the input voltage Vin, with a capacitive coupling of the capacitor C1.

In the DC-DC converter 2 in FIG. 10, since stable conductivity is maintained at the high-side transistor FET1, a conductive impedance of the high-side transistor FET1 becomes high, that is, non-conduction of the high-side transistor FET1 may be prevented when the high-side transistor FET1 becomes conductive.

In the DC-DC converter 2 in FIG. 10, although the switch SW2 becomes conductive during a period in which the high-side transistor control signal ASTih is at the low level, as in the example of controlling a low-side AST input signal ASTil in a DC-DC converter 1 in FIG. 3, a configuration may be allowed such that the switch SW2 becomes conductive in a predetermined period before the high-side transistor control signal ASTih shifts to the high level.

Figure 11:
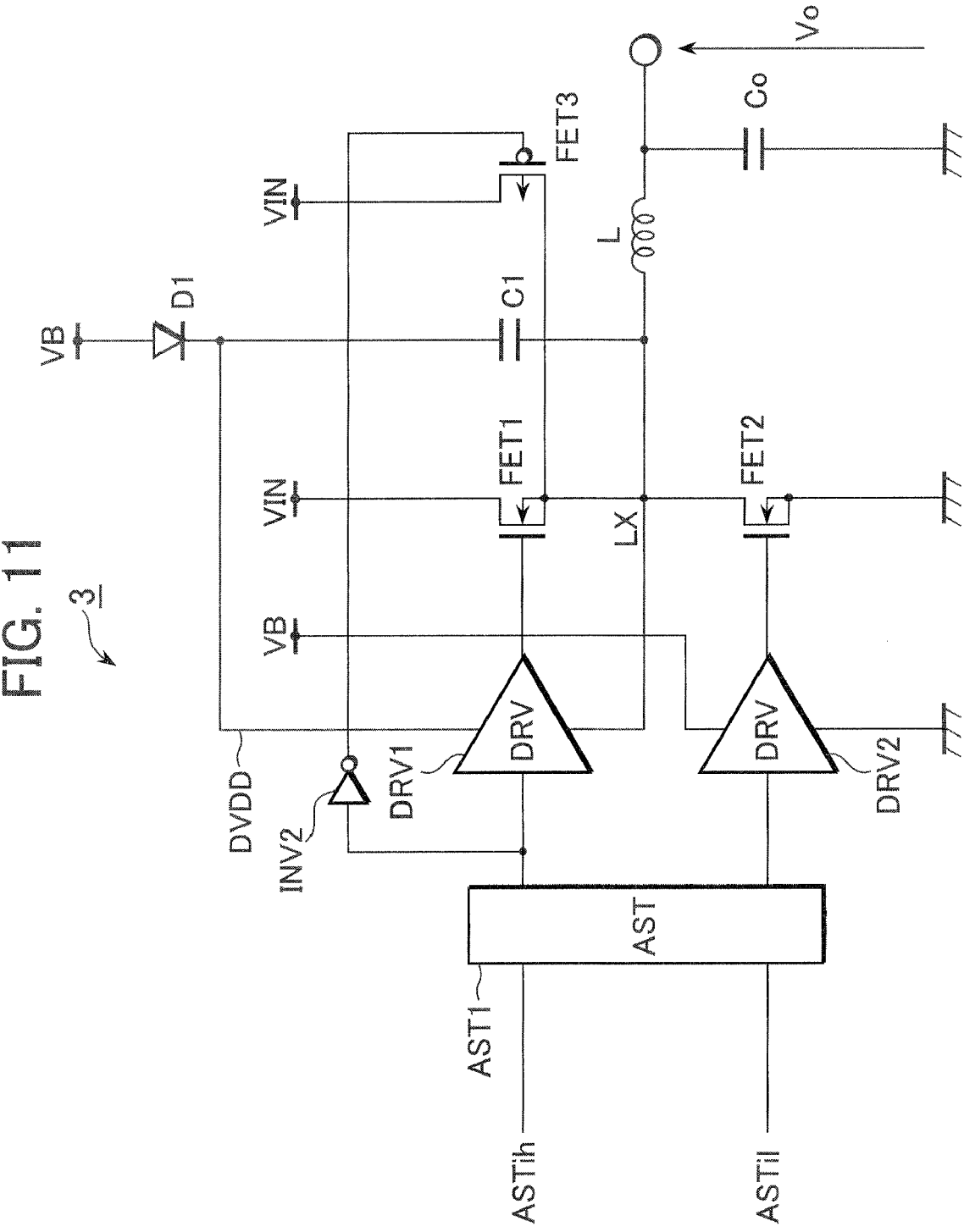
FIG. 11 illustrates a circuit diagram of a DC-DC converter according to a third exemplary embodiment in accordance with aspects of the present invention.

FIG. 11 illustrates a DC-DC converter 3 according to a third exemplary embodiment in accordance with aspects of the present invention. The DC-DC converter 3 has a configuration in which a low-side n-type FET control circuit 10 is removed from the DC-DC converter 1 of the first embodiment and an inverter INV2 and a high-side transistor FET3 are added. Hereinafter, the same reference numerals as those in the first embodiment denote the same or corresponding parts as those in the first embodiment, and the descriptions thereof will be reduced or omitted.

As shown in FIG. 11, an input of the inverter INV2 is coupled to a high-side output terminal of an anti-shoot-through AST1. An output of the inverter INV2 is coupled to a gate of the high-side transistor FET3.

The high-side transistor FET3 is a p-type field effect transistor (FET) A source of the high-side transistor FET3 is coupled to an input voltage Vin. A drain of the high-side transistor FET3 is coupled to a node LX.

According to the DC-DC converter 3 in FIG. 11, when a high-side transistor control signal ASTih shifts from a low level to a high level, the high-side transistor FET3 becomes conductive. When the high-side transistor FET3 becomes conductive, non-conduction of the high-side transistor FET3 may be prevented when the high-side transistor FET3 becomes conductive, even in a case of discontinuous conduction mode (DCM).

The high-side transistor FET1 is an example of a high-side n-type FET. The low-side transistor FET2 is an example of a low-side n-type FET. The capacitor C1 is an example of a coupling capacitor. The low-side n-type FET control circuit 10 is an example of a switch controller. The high-side n-type FET conduction detector 30 is an example of a detector. The low-side n-type FET conduction controller 40 is an example of a low-side n-type FET controller. The voltage offset circuit 32 is an example of an offset unit. The comparator 33 is an example of a comparator unit. The delay element 41 and the AND gate are examples of a first one-shot multi-vibrator. The one-shot multi-vibrator 43 is an example of a second one-shot multi-vibrator. The switch SW1 is an example of a first switch. The switch SW2 is an example of a second switch. The inverter INV is an example of a switch controller.

The exemplary embodiments disclosed above provide a DC-DC converter in which a high-side is caused to become conductive even in a case where the DC-DC converter operates in the discontinuous conduction mode (DCM) and the exemplary embodiments disclosed above provide a method of controlling the DC-DC converter.

Aspects of the exemplary embodiments disclosed above may include a switch unit that becomes conductive before conduction of the high-side n-type FET coupled to a first voltage and the switch unit becomes non-conductive in synchronization with the conduction of the high-side n-type FET. In response to operations of the switch unit, the first end on a drain side of the low-side n-type FET of a coupling capacitor is coupled to the ground voltage, before the conduction of the high-side n-type FET. Other aspects of the exemplary embodiments disclosed above may include the switch unit becoming conductive before the conduction of the high-side n-type FET coupled to the first voltage and the switch unit becoming non-conductive in synchronization with the conduction of the high-side n-type FET. In response to the operations of the switch unit, the first end on a source side of the high-side n-type FET of the coupling capacitor is coupled to a ground potential, before the conduction of the high-side n-type FET.

According to the exemplary embodiment disclosed above, a potential difference across the coupling capacitor becomes a value substantially equal to a power supply voltage. When the high-side n-type FET becomes conductive, a voltage applied to a gate of the high-side n-type FET with a capacitive coupling of the coupling capacitor becomes substantially equal to an input voltage plus (+) a first voltage. Thus, since the high-side n-type FET becomes conductive, a conductive impedance of the high-side n-type FET becomes high even in the DCM, that is, non-conduction of the high-side n-type FET in timing at which the high-side n-type becomes conductive may be prevented.

Yet another aspect of the exemplary embodiments disclosed above may include a high-side p-type FET, to which an inverted signal of a control signal of the high-side n-type FET is input, is coupled in parallel to the high-side n-type FET. Thus, since the high-side p-type FET is sufficiently becomes conductive when the high-side n-type FET becomes conductive even in the DCM, non-conduction of the high-side n-type FET when the high-side n-type becomes conductive may be prevented.

Yet another aspect of the exemplary embodiments disclosed above, may include preventing a reduction in a coupling voltage of the bootstrap circuit, because the electric potential of the first end of the capacitor is reduced in response to the first control signal which activates the first transistor. Thus, the conductive impedance of the high-side n-type FET becomes high even in the DCM, that is, the non-conduction of the high-side transistor FET may be prevented when the high-side transistor FET becomes conductive.

Example embodiments of the present invention have now been disclosed in accordance with the above advantages. It will be appreciated that these examples are merely illustrative of the invention. Numbers applying embodiments (first, second or third etc.) do not show priorities of the embodiments. Many variations and modifications will be apparent to those skilled in the art.

What is claimed is:

1. A DC-DC converter, comprising:
   a first transistor coupled to a first power supply line and having a first conductivity type;
   a second transistor coupled between the first transistor and a second power supply line, and having the first conductivity type;
   an output unit driving a first control signal causing the first transistor to become conductive, based on a drive voltage, and outputting the first control signal to the first transistor;
   a boot strap circuit including a capacitor having a first end coupled to a node of the first transistor and the second transistor and supplying the output unit with the drive voltage based on the capacitor, wherein an electric potential of the first end is reduced before the first transistor becomes conductive; and
   a first switch coupling and decoupling the first end of the capacitor and the second power supply line,
   wherein an electric potential of the first power supply line is higher than an electric potential of the second power supply line, and the first switch couples the first end and the second power supply line in response to the first control signal, and reduces the electric potential of the first end.

2. The DC-DC converter according to claim 1, wherein an electric potential of the first power supply line is higher than an electric potential of the second power supply line, and the electric potential of the first end is reduced by causing the second transistor to become conductive.

3. The DC-DC converter according to claim 1, wherein the first control signal is generated when the first transistor and the second transistor are non-conductive.

4. A DC-DC converter, comprising:
   a first transistor coupled to a first power supply line and having a first conductivity type;
   a second transistor coupled between the first transistor and a second power supply line, and having the first conductivity type;
   an output unit driving a first control signal causing the first transistor to become conductive, based on a drive voltage, and outputting the first control signal to the first transistor;
   a boot strap circuit including a capacitor having a first end coupled to a node of the first transistor and the second transistor and supplying the output unit with the drive voltage based on the capacitor, wherein an electric potential of the first end is reduced before the first transistor becomes conductive; and
   a third transistor of a second conductivity type coupled between the first power supply line and the node, coupled in parallel with the first transistor, and received an inverted signal of the first control signal.

5. A DC-DC converter comprising:
   a first transistor of a first conductivity type;
   a coupling capacitor coupled between a first voltage and a source of a first transistor;

a switch unit coupled between a ground potential and a coupling capacitor; and a switch controller causing the switch unit to become conductive before conduction of the first transistor and causes the switch unit to become non-conductive in synchronization with the conduction of the first transistor, wherein the switch unit is a second transistor of the first conductivity type, and the switch controller includes a first detector detecting the conduction of the first transistor and a second transistor controller controlling conduction of the second transistor in response to a result of the first detector.

6. The DC-DC converter according to claim 5, wherein the first detector outputs an output signal based on a second edge that is different from a first edge of a clock signal, wherein clock signal is derived from a switching control signal of the first transistor.

7. The DC-DC converter according to claim 5 further comprising:

an error amplifier comparing an output voltage and a reference voltage; and a triangular wave oscillator outputting a triangular wave, wherein the first detector includes:

an offset unit applying an offset to at least one of an output signal of the error amplifier and an output signal of the triangular wave oscillator such that the output signal of the error amplifier and the output signal of the oscillator intersect at second timing which is earlier than first timing, in a voltage mode and a second detector which detects the second timing, and wherein the second transistor controller controls the conduction of the second transistor in response to a result of the second detector.

8. The DC-DC converter according to claim 7, wherein when the first transistor becomes conductive in a condition in which the output signal of the triangular wave oscillator has a higher voltage than the output signal of the error amplifier, the offset unit applies the offset to the output signal of the triangular wave oscillator.

9. The DC-DC converter according to claim 5, wherein when the second transistor controller detects an output signal of the first detector, the second transistor controller causes the second transistor to become conductive after a predetermined period has elapsed and causes the second transistor to become non-conductive in synchronization with the conduction of the first transistor.

10. The DC-DC converter according to claim 9, wherein the second transistor controller includes:

a first one-shot multi-vibrator outputting , when detecting the output signal of the first detector, a trigger signal after the predetermined period has elapsed; and a second one-shot multi-vibrator causing the second transistor to become conductive until before the conduction of the first transistor, in response to the trigger signal.

11. A DC-DC converter comprising:

a first transistor of a first conductivity type;

a coupling capacitor coupled between a first voltage and a source of a first transistor;

a switch unit coupled between a ground potential and a coupling capacitor; and a switch controller causing the switch unit to become conductive before conduction of the first transistor and causes the switch unit to become non-conductive in synchronization with the conduction of the first transistor, wherein the switch unit includes:

a first switch coupled between the ground potential and a first end on an opposite side of the first voltage of the coupling capacitor and a second switch coupled between the source of the first transistor and the first end on the opposite side of the first voltage of the coupling capacitor, wherein when a switching control signal is at a high level, the switch controller causes the second switch to become conductive and causes the first switch and the second switch to operate complementary with each other.

12. A method of controlling the DC-DC converter comprising:

reducing an electric potential of a first end of a capacitor, the first end being coupled to a node of a first transistor coupled to a first power supply line and having a first conductivity type, and a second transistor coupled between the first transistor and a second power supply line and having the first conductivity type;

driving a first control signal, wherein the first control signal causes the first transistor to become conductive based on a drive voltage in response to the capacitor, after reducing the electric potential of the first end;

coupling the first end of the capacitor and the second power supply in response to the first control signal; and reducing the electric potential of the first end of the capacitor, wherein the electric potential of the first power supply line is higher than an electric potential of the second power supply line.

13. The method of controlling the DC-DC converter according to claim 12, further comprising:

causing the second transistor to become conductive; and reducing the electric potential of the first end, wherein the electric potential of the first power supply line is higher than an electric potential of the second power supply line.

14. The method of controlling the DC-DC converter according to claim 12, further comprising:

generating the first control signal when the first transistor and the second transistor are non-conductive.

* * * * *